United States Patent [19]

Kronogard

[11] 4,252,205
[45] * Feb. 24, 1981

[54] VEHICLE HAVING AT LEAST TWO DRIVEN AXLES

[76] Inventor: Sven-Olof Kronogard, Karstorpsvägen 31, Lomma, Sweden, 234 00

[*] Notice: The portion of the term of this patent subsequent to Jul. 29, 1997, has been disclaimed.

[21] Appl. No.: 51,066

[22] Filed: Jun. 22, 1979

Related U.S. Application Data

[63] Continuation-in-part of Ser. No. 842,900, Oct. 17, 1977, Pat. No. 4,185,710.

[30] Foreign Application Priority Data

Oct. 21, 1976 [SE] Sweden ................... 7611668

[51] Int. Cl.³ ............................................. B62D 59/04
[52] U.S. Cl. ................... 180/14 A; 60/717; 60/719; 180/54 C; 180/65 A; 180/243
[58] Field of Search ............... 180/14 A, 14 D, 242, 180/243, 54 C, 65 A; 60/717, 719

[56] References Cited

U.S. PATENT DOCUMENTS

| 3,817,341 | 6/1974 | Greene | 180/14 D |
|---|---|---|---|
| 4,185,710 | 1/1980 | Kronogard | 180/14 A |

Primary Examiner—John J. Love
Assistant Examiner—Donn McGiehan
Attorney, Agent, or Firm—Cantor and Singer

[57] ABSTRACT

A vehicle having at least two driven axles is powered by a gas turbine plant having two separate take-off shafts. One of these is connected to a first driven axle by a mechanical gearing, while the other take-off shaft is connected to a second driven axle by way of a hydraulic transmission including a constant volume pump and motor. The two turbine shafts are interconnected by a transmission, which preferably is of the infinitely variable type. Adjustable guide vanes are provided at the inlet to at least one of the turbine rotors for occasional distribution of the total load between the two rotors.

1 Claim, 3 Drawing Figures

VEHICLE HAVING AT LEAST TWO DRIVEN AXLES

CROSS-REFERENCE TO RELATED APPLICATION

This application is a continuation-in-part of co-pending Application Ser. No. 842,900, filed Oct. 17, 1977, now U.S. Pat. No. 4,185,710, granted Jan. 29, 1980.

BACKGROUND OF THE INVENTION

With many vehicles it is desirable to perform the driving at two or more axles. When transporting heavy loads, especially by means of articulated vehicles, it is difficult to arrange a mechanical power transfer to axles located in a part of the vehicle, remote from the part carrying the prime mover.

Hydraulic transfer systems have been proposed, as well as combined systems where the prime mover drives upon one axle by conventional, mechanical gearing, whereas the transfer of torque to an axle, or axles, remotely located with respect to the prime mover has occured by way of a hydraulic transmission.

The prime mover has then been an internal combustion engine, and the hydraulic transmission has included a variable volume pump, necessitating a special system, or means, to adjust the capacity of the pump. Such systems are expensive and will easily suffer from operating troubles. These systems further include some kind of power divider, usually of a mechanical type, which allots a certain portion of the total output from the internal combustion engine to the hydraulic system.

SUMMARY OF THE INVENTION

According to the present invention the prime mover of the vehicle is a gas turbine having at least two turbine rotors mounted upon separate shafts, being interconnected by a variable transmission. One of said turbine shafts is, by way of a mechanical gearing, connected to a first of said axles, while the second of said turbine shafts, by way of a hydraulic transmission including a constant volume displacement pump and a constant volume hydraulic motor driven thereby, is connected to a second of said axles. Adjustable guide vanes are provided at the inlet to at least one of the rotors for distributing the load between the two turbine shafts. The plant further includes an air preheater for recirculating heat in the exhaust from the second turbine rotor to the combustor of the gas generating part.

A portion of the power output may then be transferred by mechanical transfer means to an adjacent driving axle, whereas driving axles located remotely with respect to the prime mover, or carrying a part of the vehicle, being articulatedly connected to the part carrying the prime mover, are supplied with torque by way of the non-mechanical hydraulic transmission. The expression driving axle is here used as a collective definition, irrespective of the final, ground engaging means being wheels, tracks or the like.

The gas turbine has two separate rotors, each rotor having its own power take-off shaft. A variable transmission interconnects the shafts and at least one of the rotors is provided with adjustable inlet guide means, so as to make possible a rapid and efficient distribution of the total power output between the two take-off shafts, as required by the occasional load upon the plant.

The constant volume hydraulic transfer system has few movable parts, and is cheap in production and reliable in operation. The transmission interconnecting the two turbine rotors makes it possible to predetermine transfer of a torque, one way or the other, between the rotors. The transmission may be arranged for stepwise adjustment, but is preferably of the infinitely variable type.

Unavoidable slipping of the driving wheels, for instance during starting, or whenever the applied torque exceeds the ground engagement will result in gas passing the rotor without delivering its full heat content. This wastage will however be largely recovered in the heat exchanger and transferred back to the combustor, ensuring an economic operation. This makes the two shafts gas turbine far more economic in use than the conventional internal combustion engine plus a power divider.

Slipping may occur at any of the sets of wheels, hardly at all wheels simultaneously, and the turbine with its two power rotors will form an aerodynamic power divider, which automatically adjusts losses due to slipping of any of the driving wheels.

BRIEF DESCRIPTION OF SOME PREFERRED EMBODIMENTS

Figure 1:
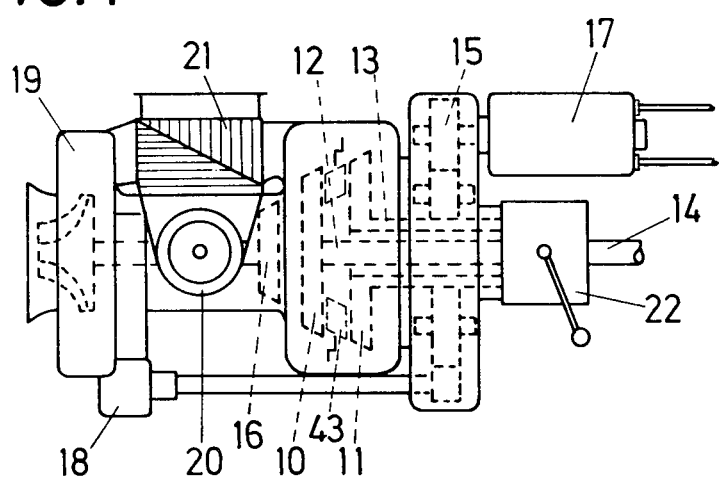
FIG. 1 schematically shows a gas turbine, suitable for propulsion of a vehicle of the type actual here.

The prime mover shown in FIG. 1 is a gas turbine plant including the components making it fit for use with vehicles of the types actual here, i.e. it has at least two rotors 10 and 11, operating upon shafts 12 and 13, respectively, the latter being tubular and enclosing the first mentioned one. Shaft 12 is, in the first hand, intended to drive an output shaft 14, which, by way of a transmission (not shown), is connected to a first driving axle of the vehicle.

The other turbine shaft 13 will, in the first hand drive a hydraulic pump 17 of the constant volume displacement type, as well as conventional auxiliaries 18 of the plant, by way of a transmission 15.

The plant further includes a compressor 19, which in any suitable manner, not shown, is driven by either of rotors 10 or 11, or by a further rotor 15. The compressed air is conducted from the compressor to a combustor 20 by way of an air preheater 21, through which the exhaust from the turbine rotors also passes.

The two turbine rotor shafts 12 and 13 are interconnected by means of a transmission 22, preferably of the infinitely variable type. There are adjustable inlet guide vanes 43 at the inlet to rotor 11, by means of which the available power output, at will, may be distributed between the primary output shaft 14 and the apparatus driven by transmission 15.

Figure 2:
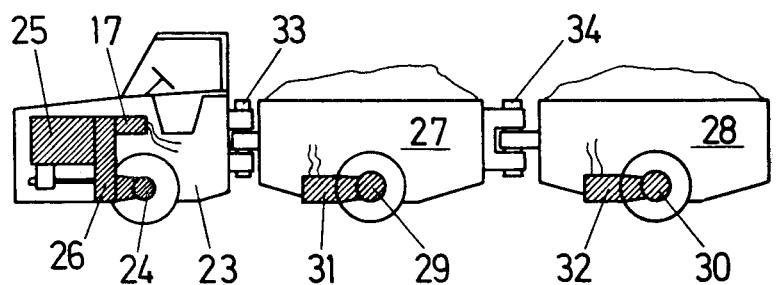
FIG. 2 shows an articulated truck equipped with a power plant according to the invention.

FIG. 2 shows an articulated truck provided with a power plant according to the invention. The truck includes a first portion 23 having one driving axle 24 and carrying a prime mover 25 of basically the same type as described above in connection with FIG. 1, as well as the necessary steering and governing equipment. A transmission of conventional mechanical type, between prime mover 25 and the first driving axle 24, is denoted by 26.

The truck further has two load carrying portions 27 and 28, being formed as open containers adapted for the transportation of bulk goods, such as ore. Each of these portions is, in this embodiment, carried by a wheeled axle 29 and 30, respectively, being equipped for driving by means of hydraulic motors 31 and 32, respectively. These motors are supplied with pressure fluid from pump 17 at a rate determined by the speed thereof.

The portions of the truck are interconnected by articulated joints, 33, 34. The hydraulic piping transferring the pressure fluid past these joints is not shown, but may be arranged in any suitable manner.

The hydraulic pump 17 may also supply jacks of well known type, located at cargo carrying portions 27 and 28, with pressure fluid, so the containers may be dumped in a conventional way. Pressure fluid may also be supplied to loading equipment (not shown), for instance of the scraper type.

Figure 3:
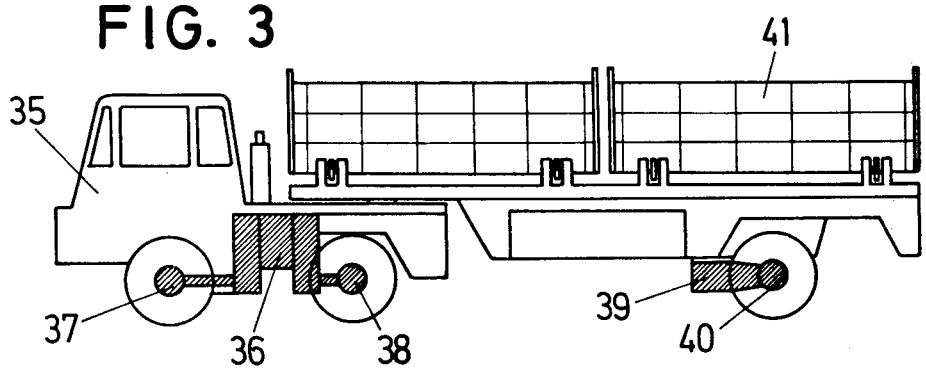
FIG. 3 shows a so called side dump truck having a somewhat modified power plant.

FIG. 3 shows the invention as used in a modified embodiment at a side dumping truck. This includes a first portion 35 supporting the prime mover 36 and the governing equipment, and is provided with ground engaging wheels at two driving axles 37 and 38, which on this occasion both are driven by mechanical transmissions from prime mover 36.

This is also here a gas turbine of the type described in connection with FIG. 1, and the hydraulic pump 17 delivers pressure fluid to hydraulic motors 39 driving at axle 40, at a load carrying portion 41. This is pivotably connected to the first portion, and is provided with jacks (not shown) for tilting the cargo containers.

The details of the invention may of course further be varied and combined in many different ways within the scope of the appended claims, and the embodiments shown must be regarded as examples only.

The invention may thus be used with many other vehicles, such as forestry processing machines, earth moving machines, harvesting combines and for military purposes.

What I claim is:

1. A vehicle having at least first and second driving axles supported by ground engaging members and comprising:
   (A) a prime mover including a gas turbine having at least two turbine rotors mounted upon separate first and second shafts and supplied with motive gas from a common gas generating portion including at least one combustor,
   (B) a mechanical gearing means connecting said first turbine shaft with said first driving axle,
   (C) a hydraulic transmission including a constant volume displacement pump and a constant volume hydraulic motor driven thereby connecting said second turbine shaft with said second driving axle,
   (D) a variable transmission interconnecting said mechanical gearing means and said hydraulic transmission by way of said first and second rotor shafts,
   (E) adjustable guide vanes at the inlet of at least one of said turbine rotors for distribution of the total load between said first and said second turbine shafts, and
   (F) air preheater means for recirculating heat in the exhaust from the second turbine rotor by way of the combustor.

* * * * *